(12) United States Patent
Gardner et al.

(10) Patent No.: US 8,372,320 B2
(45) Date of Patent: Feb. 12, 2013

(54) METHOD FOR DRYING CELLULOSE NANOFIBRILS

(75) Inventors: Douglas J. Gardner, Brewer, ME (US);
Yousoo Han, Bangor, ME (US);
Yucheng Peng, Old Town, ME (US)

(73) Assignee: University of Maine System Board of Trustees, Bangor, ME (US)

( * ) Notice: Subject to any disclaimer, the term of this patent is extended or adjusted under 35 U.S.C. 154(b) by 84 days.

(21) Appl. No.: 13/095,315

(22) Filed: Apr. 27, 2011

(65) Prior Publication Data

US 2011/0260348 A1 Oct. 27, 2011

Related U.S. Application Data

(60) Provisional application No. 61/328,236, filed on Apr. 27, 2010.

(51) Int. Cl.
*D21C 9/00* (2006.01)
*B29B 9/00* (2006.01)
(52) U.S. Cl. .......... 264/5; 264/7; 264/13; 162/9; 162/10
(58) Field of Classification Search ........................ None
See application file for complete search history.

(56) References Cited

U.S. PATENT DOCUMENTS

| 6,308,434 | B1 | 10/2001 | Chickering, III et al. | |
| 6,837,970 | B2 | 1/2005 | Ko et al. | |
| 2001/0011516 | A1* | 8/2001 | Cantiani et al. | 106/162.1 |
| 2007/0075462 | A1 | 4/2007 | Coughlin et al. | |
| 2009/0203642 | A1 | 8/2009 | Morganti et al. | |
| 2010/0285295 | A1* | 11/2010 | Wang et al. | 428/292.4 |
| 2012/0038073 | A1* | 2/2012 | Snyder et al. | 264/12 |

FOREIGN PATENT DOCUMENTS

| EP | 2196478 A1 | 6/2010 |
| JP | 2009263652 A | 11/2009 |

OTHER PUBLICATIONS

"Cellulose Nanostructures with Tailored Fuinctionalities," EMPA Materials Science & Technology, 2009, www.empa.ch.
Gardner, "Adhesion and Surface Issues in Cellulose and Nanocellulose," Journal of Adhesion Science and Technology, 2008.
Levis, "Production and evaluation of size reduced grades of microcrystalline cellulose," International Journal of Pharmaceutics, 2001.
"Spray drying solutions for R&D and small scale production," GEA Process Engineering, GEA Niro, www.niroinc.com.
Patent Cooperation Treaty International Search Report, Application No. PCT/US2011/034096, dated Nov. 22, 2011.
Quievy, et al., "Influence of homogenization and drying on the thermal stability of microfibrillated cellulose", Polymer Degradation and Stability, 2010, vol. 95, pp. 306-314.
Zimmermann, et al., "Properties of nanofibrillated cellulose from different raw materials and its reinforcement potential", Carbohydrate Poylmers, 2010, vol. 79, pp. 1086-1093.

* cited by examiner

*Primary Examiner* — Mary F Theisen
(74) *Attorney, Agent, or Firm* — MacMillan, Sobanski & Todd, LLC

(57) ABSTRACT

A method of producing dried cellulose nanofibrils includes atomizing an aqueous suspension of cellulose nanofibrils and introducing the atomized aqueous suspension into a drying chamber of a drying apparatus. The aqueous suspension is then dried, thereby forming substantially non-agglomerated dried cellulose nanofibrils.

18 Claims, 6 Drawing Sheets

METHOD FOR DRYING CELLULOSE NANOFIBRILS

BACKGROUND

Various embodiments of a method of producing dried cellulose nanofibrils are described herein. In particular, the embodiments described herein relate to an improved method of producing dried cellulose nanofibrils.

Cellulose nanoscale products, such as cellulose nanofibrils (CNF), nano-fibrillated cellulose (NFC), and cellulose nanocrystals (CNC) may be produced from mechanical or chemo-biological processing. Because of the processing methods, all the intermediate cellulose products exist in aqueous medium, which requires additional processes for production of dry products. Dehydrolysis of wet cellulose products poses a challenge since a number of hydroxyls from cellulose contribute to hydrophilicity that holds together water molecules, as well as other cellulose chains. Drying cellulose affects the final dimensions of cellulose crystals and fibrils due to the aggregation of individual fibrils. The cellulose fibrils or crystals in CNF, NFC, and CNC agglomerate with other fibrils or crystals as water is removed from the aqueous medium in drying processes such as freeze drying, critical point drying, spray drying, oven drying, and air drying.

It is desirable to provide an improved method of drying an aqueous suspension of cellulose nanofibrils to produce dry cellulose nanofibrils that may be used in non-aqueous applications, such as in non-polar polymer matrices used in forming non-polar polymer composites.

SUMMARY

The present application describes various embodiments of a method of producing dried cellulose nanofibrils. One embodiment of the method of producing dried cellulose nanofibrils includes atomizing an aqueous suspension of cellulose nanofibrils and introducing the atomized aqueous suspension into a drying chamber of a drying apparatus. The aqueous suspension is then dried, thereby forming substantially non-agglomerated dried cellulose nanofibrils.

In another embodiment, a method of producing dried cellulose nanofibrils includes atomizing an aqueous suspension of cellulose nanofibrils and introducing the atomized aqueous suspension into a drying chamber of a drying apparatus. The cellulose nanofibrils in the aqueous suspension comprise cellulose nanocrystals, and the aqueous suspension further includes a surface modification agent which substantially prevents agglomeration of the cellulose nanofibrils. A drying gas is introduced into the drying chamber to evaporate a liquid portion of the aqueous suspension, thereby forming dried cellulose nanofibrils.

In a further embodiment, a method of producing dried cellulose nanofibrils includes atomizing an aqueous suspension of cellulose nanofibrils and introducing the atomized aqueous suspension into a drying chamber of a drying apparatus. The cellulose nanofibrils in the aqueous suspension comprise nanofibrillated cellulose fiber, and the aqueous suspension further includes a surface modification agent which substantially prevents agglomeration of the cellulose nanofibrils. A drying gas is introduced into the drying chamber to evaporate a liquid portion of the aqueous suspension, thereby forming dried cellulose nanofibrils.

Other advantages of the method of producing dried cellulose nanofibrils will become apparent to those skilled in the art from the following detailed description, when read in light of the accompanying drawings.

BRIEF DESCRIPTION OF THE DRAWINGS

FIG. 2A is an enlarged schematic diagram of the exemplary NFC illustrated in FIG. 2, showing the NFC treated with sodium silicate and being dried according to the method of the invention.

DETAILED DESCRIPTION

Figure 1:
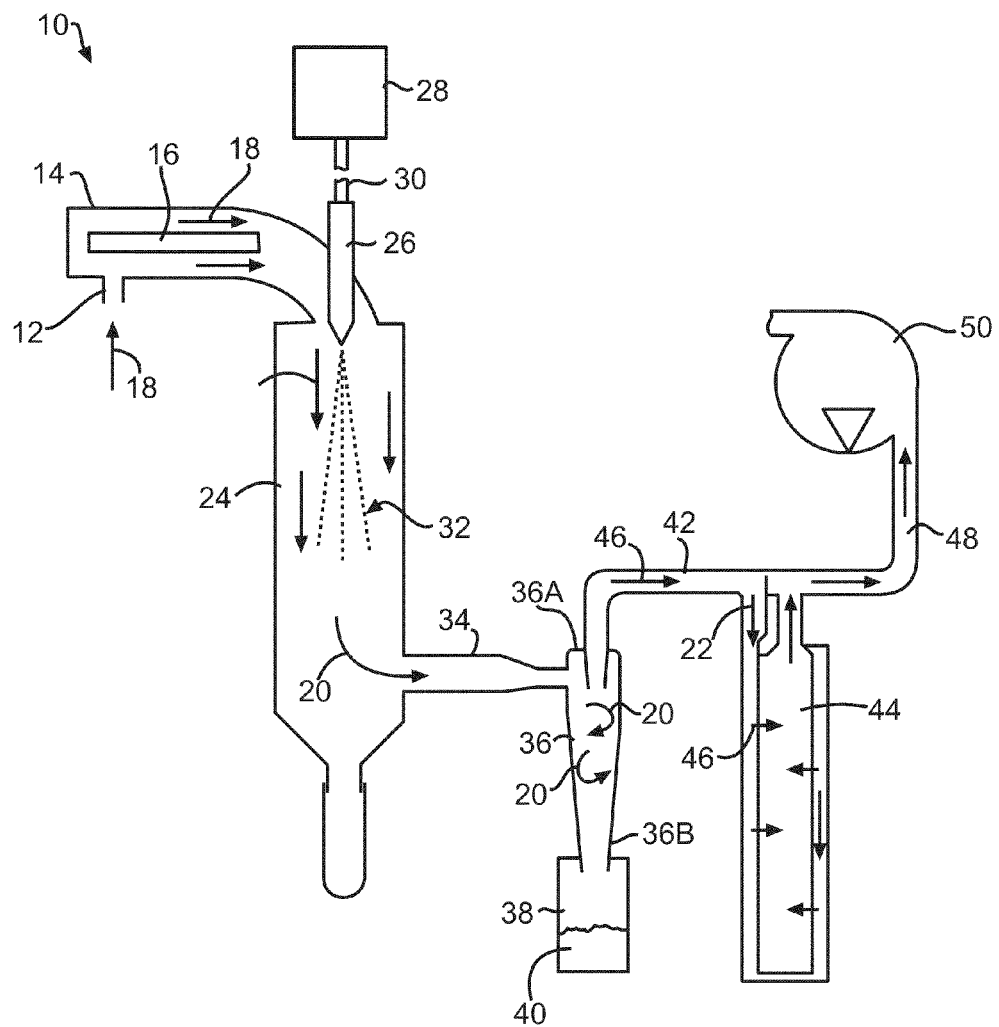
FIG. 1 is a schematic view in elevation of an embodiment of a spray dryer for use in the method of the invention.

The present invention will now be described with occasional reference to the specific embodiments of the invention. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

As used herein, the term "nanofibril" is defined as a fiber or particle of material having any shape wherein at least one dimension, e.g. the diameter, width, thickness, and the like, is about 100 nanometers or less. Such nanofibrils may include particles commonly known as nanoparticles and nanotubes.

As used herein, the phrase "spray drying" is defined as a processing method to convert a suspension, solution, or emulsion into a solid powder in one single process step. Spray drying involves evaporation of moisture from an atomized feed or spray of the suspension by mixing the spray and a drying medium. The drying medium is typically air or nitrogen.

As used herein, the term "spray dryer" is defined as an apparatus for accomplishing spray drying and removing liquid from an aqueous suspension, thereby producing a dry powder or powder-like substance. One example of such a spray dryer is the BÜCHI Mini Spray Dryer B-290 manufactured by BÜCHI Labortechnik AG, headquartered in Flawil, Switzerland and shown at http://www.buchi.com/Mini_Spray_Dryer_B-290.179.0.html.

As used herein, the term "hydrophilicity" is defined as the tendency of a molecule to be solvated by water.

As used herein, the terms "non-agglomerated" and "substantially non-agglomerated" are defined as a volume of cellulose nanofibrils, including NFC and CNC wherein a majority of the dried cellulose fibrils or crystals formed according to the method of the invention are separate from, and not agglomerated with other dried cellulose fibrils or crystals, respectively. For example, the terms "non-agglomerated" and "substantially non-agglomerated" may be further defined as when within the range of about 70 percent to about 90 percent of the dried cellulose fibrils or crystals in a given volume of dried cellulose fibrils or crystals are separate from, and not agglomerated with, other dried cellulose fibrils or crystals, respectively.

The description and figures disclose an improved method for drying cellulose nanofibrils using spray drying technology. The purpose of the inventive method is to air-dry aqueous suspensions of cellulose nanofibrils using a spray dryer that maintains nanoscale dimensions and avoids the agglomeration problem commonly experienced in drying cellulose nanofibril suspensions. The nanofibrils may be treated physically, mechanically, and/or chemically in the suspension state to improve drying time, maintain nanoscale dimensions, and reinforce mechanical properties of cellulose nanofibrils, such as flexural or bending strength and stiffness, and tensile strength and stiffness. Thermal properties may also be improved, such as by creating relatively higher degradation temperatures. Also, the surface energy of the fibrils may be improved; including being made higher or lower.

Cellulose nanofibrils (CNF) may be prepared in a number of different ways and may exist in a number of different forms, including: (1) bacterial cellulose nanofibers, (2) cellulose nanofibers by electrospinning, (3) nanofibrillated cellulose (NFC), and (4) nanorods, cellulose whiskers, or cellulose nanocrystals (CNC), as described in detail in the article entitled "Adhesion and Surface Issues in Cellulose and Nanocellulose," by Douglas J. Gardner, Gloria S. Oporto, Ryan Mills, and My Ahmed Said Azizi Samir, which is hereby incorporated herein by reference in its entirety. In aqueous suspensions, cellulose nanofibrils are dispersed and can maintain nanoscale attributes. Once dried however, cellulose nanofibrils are known to agglomerate and lose their nanoscale dimensions.

Referring now to the figures, an exemplary embodiment of a spray drying apparatus or spray dryer suitable for use when performing the inventive method is shown at 10 in FIG. 1.

The illustrated exemplary spray dryer 10 includes a gas inlet 12 for the introduction of drying medium or drying gas, indicated by the arrow 18, into a first or inlet conduit 14 of the spray dryer 10. In the illustrated embodiment, the drying gas 18 is ambient air. If desired, the ambient air 18 may be heated. The first conduit 14 may include a heating element 16 to heat the ambient air 18 entering through the gas inlet 12 to a desired temperature, such as about 350 degrees F. Alternatively, the ambient air 18 may be heated to a temperature within the range of from about 300 degrees F. to about 430 degrees F. If desired, other suitable gases may be used as the drying gas 18, such as nitrogen, helium, argon, and other inert gases.

The spray dryer 10 includes a drying chamber 24. In the illustrated embodiment, the drying chamber 24 is substantially cylindrical and includes a first end 24A (upper end when viewing FIG. 1) and a second end 24B (lower end when viewing FIG. 1). Drying gas 18 enters the upper end 24A of the drying chamber 24 through the first conduit 14. Alternatively, the drying chamber 24 may have any other desirable shape.

A spray nozzle 26 for atomizing an aqueous suspension of cellulose nanofibrils (CNF) extends into the first end 24A of the drying chamber 24. The spray nozzle 26 is connected to a source of aqueous suspension of CNF 28 by a second conduit 30. The spay nozzle 26 atomizes the aqueous suspension and introduces the atomized aqueous suspension 32 into the drying chamber 24 of the spray drying apparatus 10. Water in the atomized aqueous suspension 32 is evaporated leaving dried CNF 40. It will be understood that any desired means may be used to atomize an aqueous suspension of cellulose nanofibrils (CNF), such as a two-fluid nozzle, a rotary nozzle, a pressure nozzle, and an ultrasonic atomizer.

A third conduit 34 connects the drying chamber 24 and a separation chamber or cyclone 36. A CNF collection chamber 38 is attached to the lower end 36B of the cyclone 36.

Dried CNF 40 move through the third conduit 24 in a stream of air, as indicated by the arrow 20, to the cyclone 36. In the cyclone 36, the dried CNF 40 are separated from the stream of air 20 and collected in the CNF collection chamber 38.

A fourth conduit 42 connects the cyclone 36 and an outlet filter 44 for separating and collecting dried CNF particles, as indicated by the arrow 46, too small to be collected in the collection chamber 38.

A fifth conduit 48 connects the outlet filter 44 to a pump 50 which pulls the drying gas 18 and CNF through the spray dryer 10.

Figure 2:
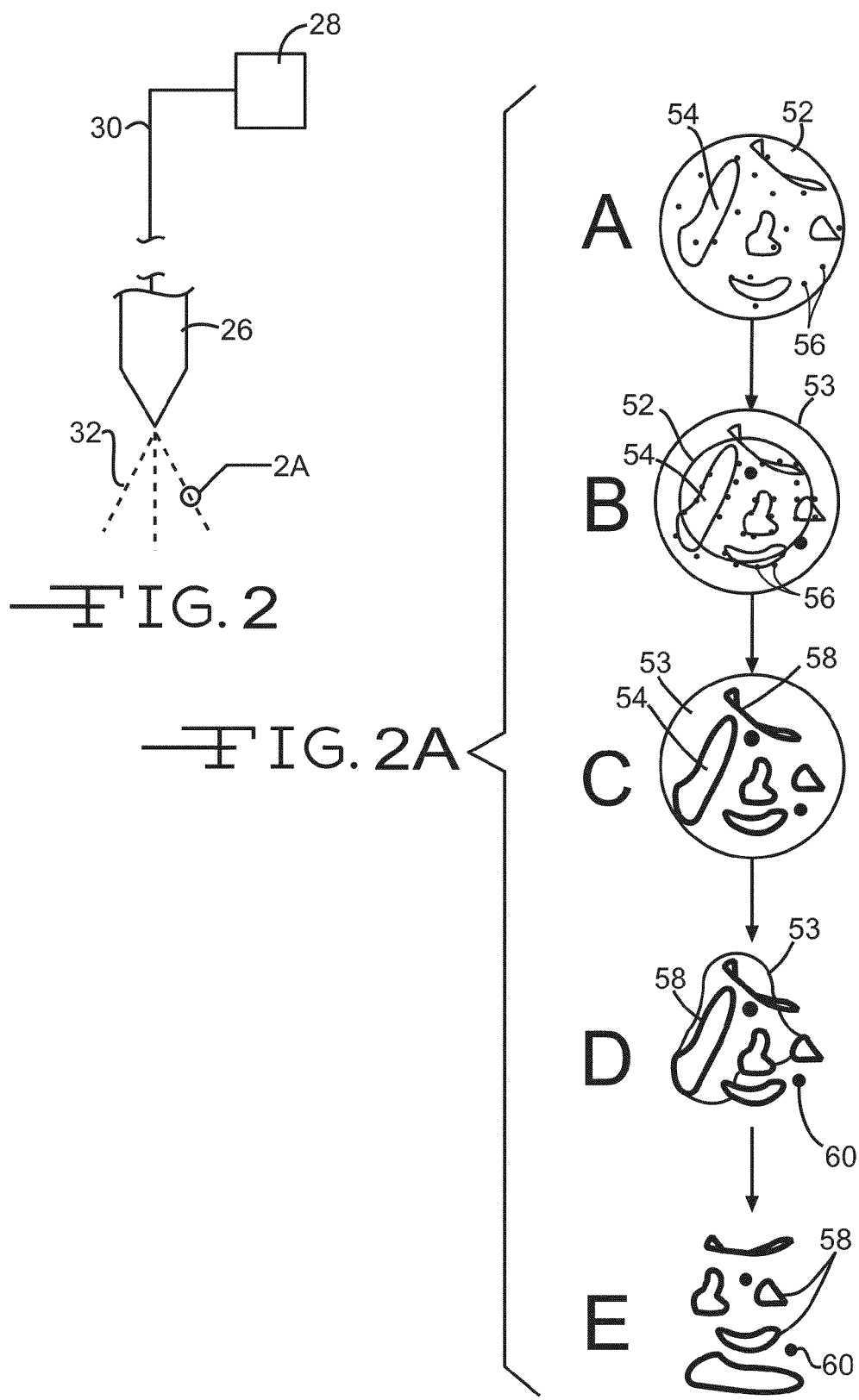
FIG. 2 is a schematic diagram of exemplary nanofibrillated cellulose (NFC) treated with sodium silicate and being dried according to the method of the invention.

In a first embodiment of the aqueous suspension of cellulose nanofibrils, the surfaces of the CNF may be chemically modified by adding a surface modification agent to the aqueous suspension of cellulose nanofibrils. In the illustrated embodiment, the surface modification agent is sodium silicate. FIGS. 2 and 2A are schematic illustrations of the formation of silicate-modified or silicate-coated CNF 58 from an aqueous suspension of CNF 54 to which sodium silicate 56 has been added. Alternatively, other silicates may be added to the aqueous suspension of cellulose nanofibrils, such as, calcium silicate hydrates, potassium silicate, lithium silicate, and any water soluble silicates. The surface modification agent may also be detergent.

As shown at A in FIG. 2A, during the CNF drying process, water droplets 52 containing CNF 54 and silicates 56 are formed during atomization of the aqueous suspension 32. As shown at B, silicates 56 are deposited on the CNF 54 as the water droplets 52 begin to vaporize and form water vapor 53. The silicates 56 then substantially instantly polymerize on the surfaces of the CNF 54. As the water vapor 53 evaporates, some silicates 56 are polymerized on the surfaces of the CNF 54 in quantities sufficient to cover the surfaces of the CNF 54 and defining silicate-coated CNF 58. Some silicates 56 also form substantially spherical nanosilicate particles 60, as shown at D, by condensation-induced polymerization followed by dehydrolysis. In the final stage of drying, as shown at E, the water has evaporated and the nanosilicate particles 60 and substantially non-agglomerated silicate-coated CNF 58 remain.

Spherical nanosilicate particles 60, as shown at E in FIG. 2A, are dispersed among the silicate-coated CNF 58. Advantageously, the silicate coating layer on the silicate-coated CNF 58 allows individual fibrils to separate from others during the evaporation of water due to the relatively lower affinity of silicates to water. The affinity of cellulose to water is much larger than the affinity of silicates to water. The relatively lower affinity of silicates to water enables silicate-coated CNF 58 to dry rapidly, thereby reducing the occurrence of individual fibrils becoming entangled or agglomerated, and reducing the size of the fibrils in the final dried silicate-coated CNF 58.

Figure 4A:
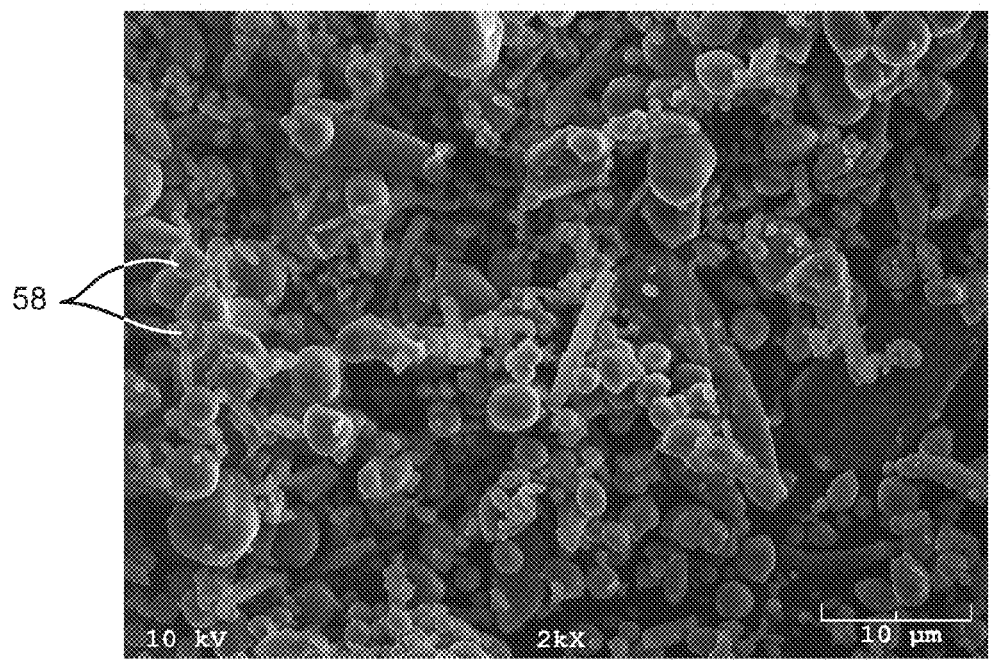
FIG. 4A is a 2,000× magnified view of dried cellulose nanofibrils derived from an aqueous suspension of CNF and sodium silicate and formed according to the method of the invention.
Figure 4B:
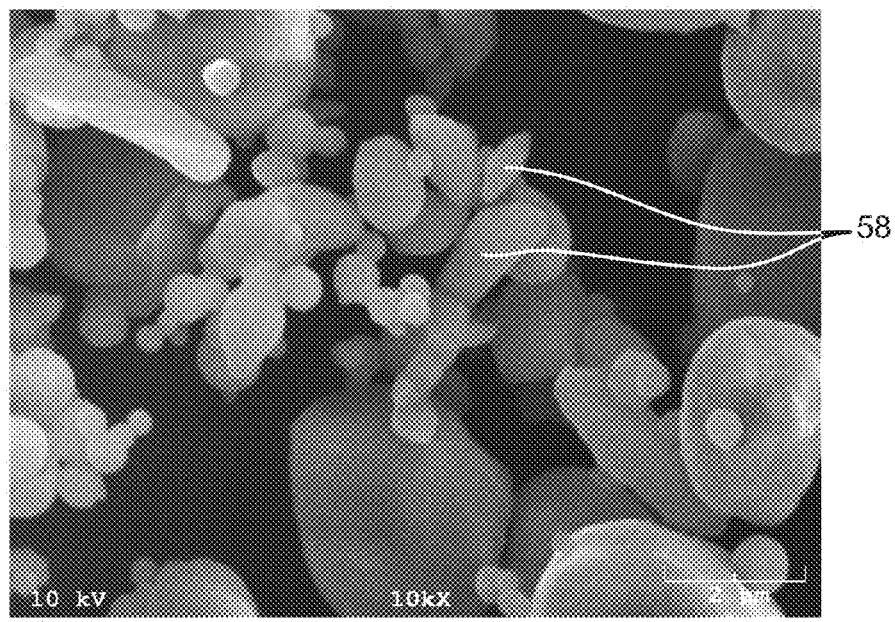
FIG. 4B is a 10,000× magnified view of the dried cellulose nanofibrils illustrated in FIG. 4A.

The surfaces of the silicate-coated CNF 58 are smoother and the shapes of the individual silicate-coated CNF 58 are more uniform relative to CNF produced by spray drying, but to which sodium silicate has not been added. Examples of dried silicate-coated CNF 58 are shown in the photographs at FIGS. 4A and 4B, in which the silicate-coated CNF 58 are shown at 2,000 magnification and 10,000× magnification, respectively.

Advantageously, the aqueous suspension of CNF may be modified by adding, in-situ, sodium silicate to the aqueous suspension of CNF.

The method of producing dried cellulose nanofibrils described above and illustrated in FIGS. 2 and 2A further produces no by-products other than the silicate-coated CNF 58, the nanosilicate particles 60, and water vapor, and is therefore environmentally friendly.

In the illustrated embodiment, the aqueous suspension of cellulose nanofibrils was formed containing about 1.5 percent by weight (weight %) of cellulose nanofibrils. Alternatively, the inventive method may be performed with an aqueous suspension of cellulose nanofibrils containing within the range of from about 0.5 weight % to about 3.0 weight % of nanofibrils. The inventive method may also be performed with an aqueous suspension of cellulose nanofibrils containing within the range of from about 0.1 weight % to about 10.0 weight % of nanofibrils.

In the illustrated embodiment, sodium silicate was added to the aqueous suspension of cellulose nanofibrils in an amount representing about 1.5 weight % of the aqueous suspension. Alternatively, the inventive method may be performed with an aqueous suspension of cellulose nanofibrils containing within the range of from about 1.0 weight % to about 5 weight % of sodium silicate. The inventive method may also be performed with an aqueous suspension of cellulose nanofibrils containing within the range of from about 0.1 weight % to about 10 weight % of sodium silicate.

If desired, the aqueous suspension of cellulose nanofibrils may also contain processing aids such as wetting agents to further lower the surface tension of the cellulose nanofibril suspensions.

Figures 3, 3A:
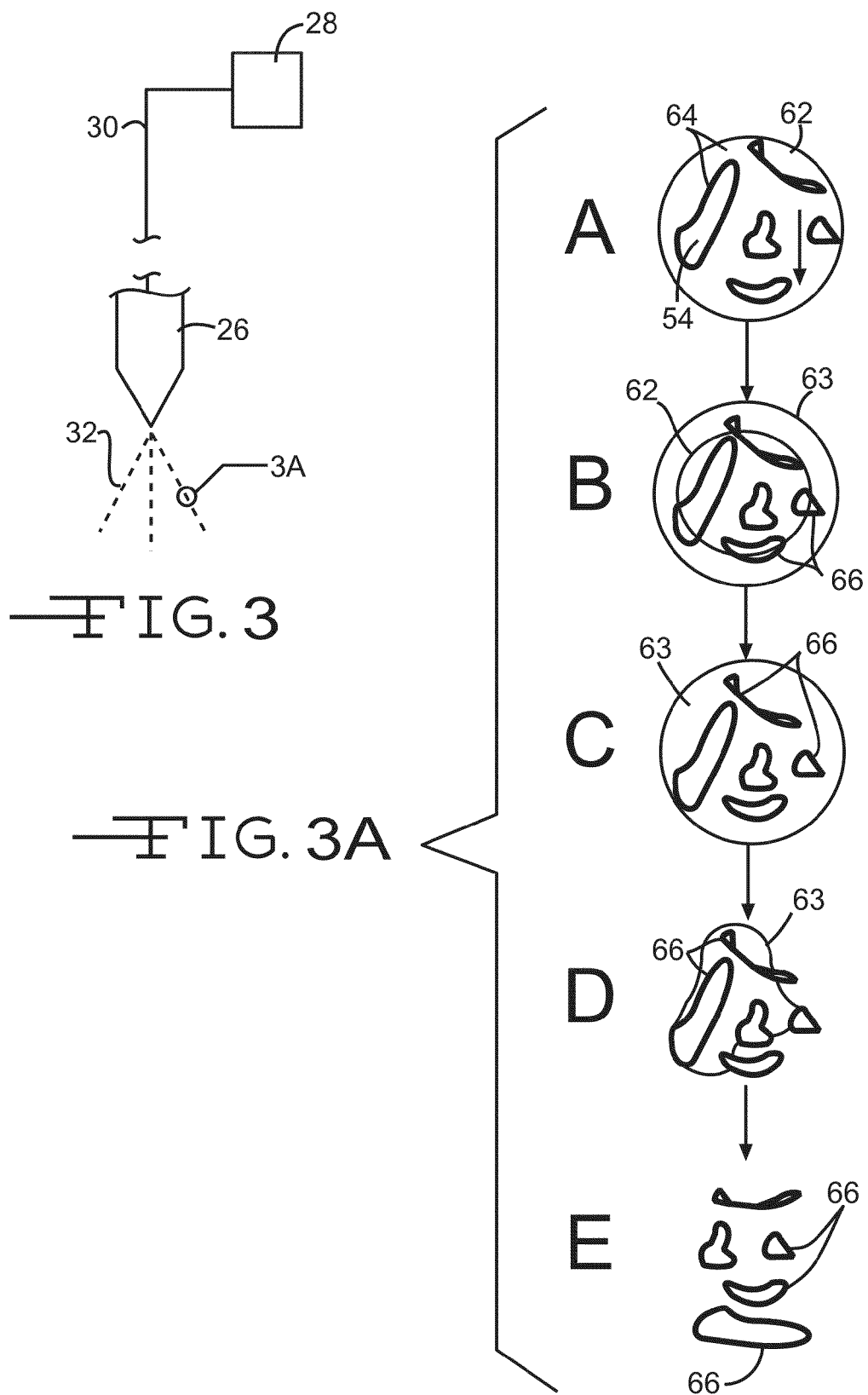
FIG. 3 is a schematic diagram of exemplary nanofibrillated cellulose (NFC) treated fluorosilane and being dried according to the method of the invention.
FIG. 3A is an enlarged schematic diagram of the exemplary NFC illustrated in FIG. 3, showing the NFC treated with fluorosilane and being dried according to the method of the invention.

In an alternate, second embodiment of the aqueous suspension of cellulose nanofibrils, the CNF may be chemically modified by fluorinating the aqueous suspension of cellulose nanofibrils, such as by adding fluorosilane to the aqueous suspension. FIGS. 3 and 3A are schematic illustrations of the formation of fluorinated CNF 66 from an aqueous suspension of CNF 54 that has been modified with a fluorinating agent. In the illustrated embodiment, the fluorinating agent is fluorosilane. Alternatively, any other fluorinating agents may be added to the aqueous suspension of cellulose nanofibrils, such as other fluorosilane compounds.

As shown at A in FIG. 3A during the CNF drying process, water droplets 62 containing CNF 54 and fluorosilane 64, mixed with the water, are formed during atomization of the aqueous suspension 32. As the water in the water droplets 62 begins to vaporize and form water vapor 63, fluorosilane 64 is deposited on the CNF 54. The fluorosilane 64 becomes grafted to the CNF 54 throughout the drying process, such as shown at B, C, and D, thereby defining fluorinated CNF 66. The surfaces of the fluorinated CNF 66 become substantially hydrophobic, thereby increasing the evaporation rate and accelerating the removal of water during the spray drying process. The increased evaporation rate helps to prevent agglomeration of fibrils, and reduces the size of the fibrils in the final dried fluorinated CNF 66. In the final stage of drying, as shown at E, the water has evaporated and the fluorinated CNF 66 remain.

In the illustrated embodiment, the aqueous suspension of cellulose nanofibrils was formed containing about 1.5 percent by weight (weight %) of cellulose nanofibrils. Alternatively, the inventive method may be performed with an aqueous suspension of cellulose nanofibrils containing within the range of from about 0.5 weight % to about 3.0 weight % of nanofibrils. The inventive method may also be performed with an aqueous suspension of cellulose nanofibrils containing within the range of from about 0.1 weight % to about 10.0 weight % of nanofibrils.

In the illustrated embodiment, the aqueous suspension of cellulose nanofibrils includes fluorosilane in an amount representing about 0.01 weight % and ethanol in an amount representing about 0.8 weight % of the aqueous suspension. Alternatively, the inventive method may be performed with an aqueous suspension of cellulose nanofibrils containing within the range of from about 0.01 weight % to about 3 weight % of fluorosilane. The inventive method may also be performed with an aqueous suspension of cellulose nanofibrils containing within the range of from about 0.1 weight % to about 25 weight % of fluorosilane.

In the above described fluorinated CNF 66, the surfaces of the fluorinated CNF 66 are smoother and the shapes of the individual silicate-coated CNF 58 are more uniform relative to untreated CNF produced by spray drying.

Figure 5A:
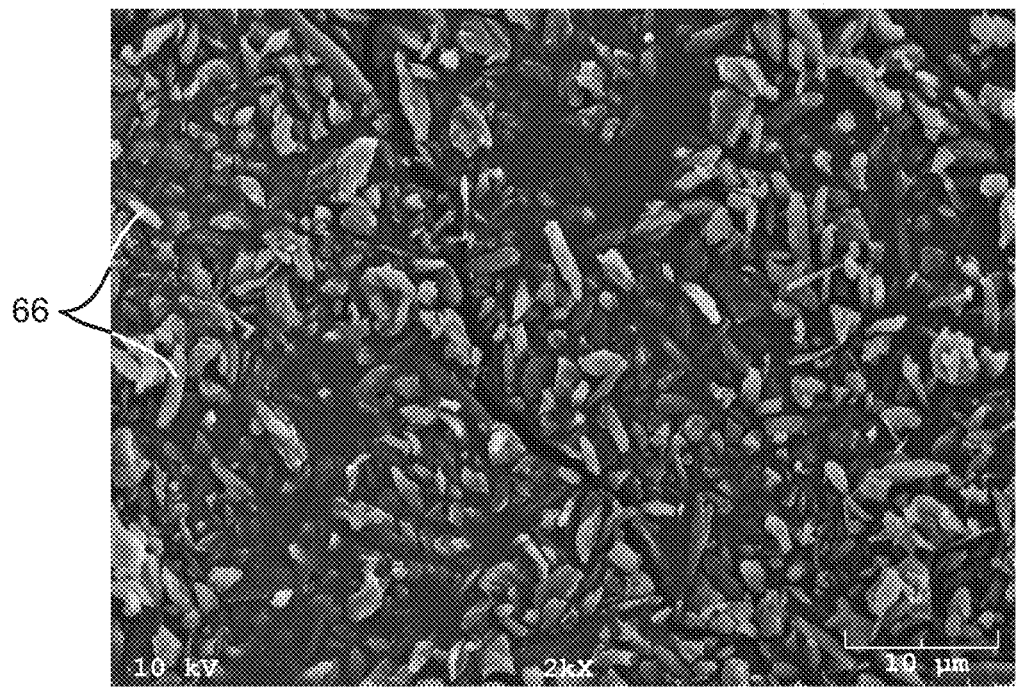
FIG. 5A is a 2,000× magnified view of a first embodiment of dried cellulose nanofibrils derived from an aqueous suspension of fluorinated CNF and formed according to the method of the invention.
Figure 5B:
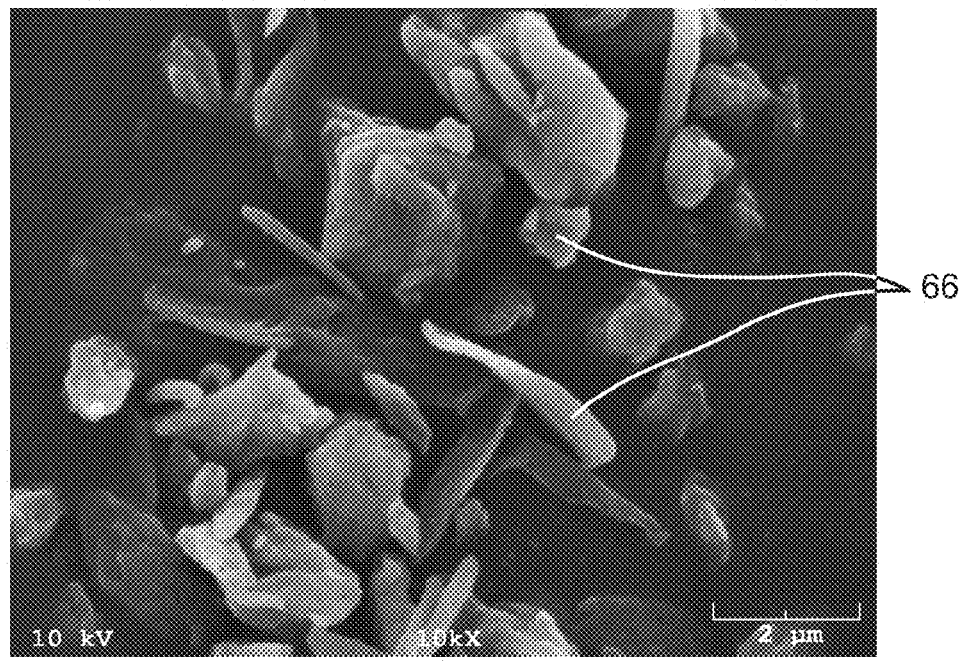
FIG. 5B is a 10,000× magnified view of the dried cellulose nanofibrils illustrated in FIG. 5A.

FIGS. 5A and 5B illustrate examples of fluorinated CNF 66 formed from an aqueous suspension of cellulose nanofibrils containing about 0.01 weight % of fluorosilane. In FIGS. 5A and 5B, examples of dried fluorinated CNF 66 are shown at 2,000 magnification and 10,000× magnification, respectively.

Figure 6A:
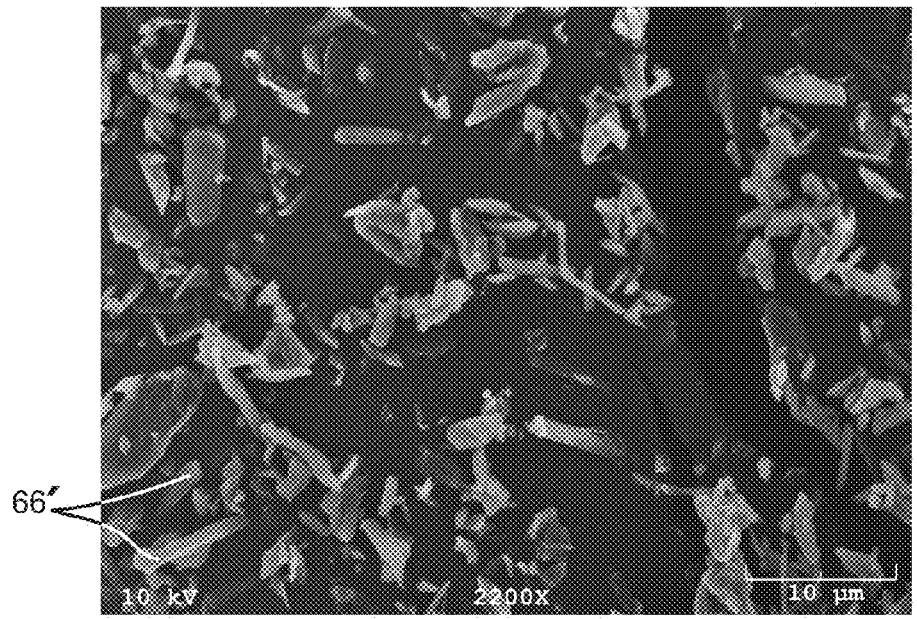
FIG. 6A is a photograph showing a 2,200× magnified view of a second embodiment of dried cellulose nanofibrils derived from an aqueous suspension of fluorinated CNF and formed according to the method of the invention.
Figure 6B:
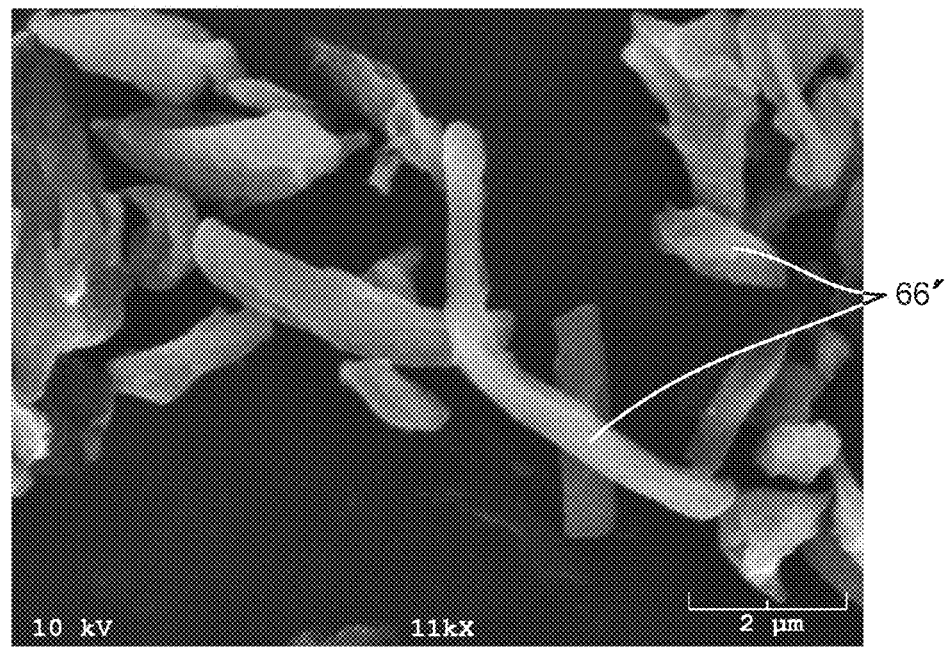
FIG. 6B is an 11,000× magnified view of the dried cellulose nanofibrils illustrated in FIG. 6A.

FIGS. 6A and 6B illustrate examples of fluorinated CNF 66' formed from an aqueous suspension of cellulose nanofibrils containing about 0.02 weight % of fluorosilane. In FIGS. 6A and 6B, examples of dried fluorinated CNF 66' are shown at 2,200 magnification and 11,000× magnification, respectively.

The method of producing dried cellulose nanofibrils described above and illustrated in FIGS. 3 and 3A also produces no by-products other than the silicate-coated CNF 58, the nanosilicate particles 60, water vapor, and ethanol or methanol, and is therefore environmentally friendly.

It will be understood that the embodiments of the aqueous suspension of cellulose nanofibrils described above may be formed with NFC, CFC, or other desired forms of CNF.

If desired, the aqueous suspension of cellulose nanofibrils may include silylated nanofibrils. Such silylated nanofibrils may be obtained using any desired method, such as the method described in the article entitled "Cellulose Nanostructures with Tailored Functionalities" (Ref. 2007-036), published by EMPA, Swiss Federal Laboratories for Materials Testing and Research, of Switzerland.

A further advantage of the method of drying cellulose nanofibrils as described herein is that the cellulose nanofibrils produced may be used in non-polar polymer composite materials without the non-polar polymer matrices or the CNF requiring chemical modification. The cellulose nanofibrils may also be produced at a cost lower than those produced in known methods. The cellulose nanofibrils produced may also be used in other applications including, but not limited to pharmaceutical excipients, medical applications, reinforcement in high quality papers, paint additives, coatings, cosmetics, and reinforcement in optically transparent films.

The principle and mode of operation of the method of drying cellulose nanofibrils have been described in its preferred embodiment. However, it should be noted that the method of drying cellulose nanofibrils described herein may be practiced otherwise than as specifically illustrated and described without departing from its scope.

What is claimed is:

1. A method of producing dried cellulose nanofibrils comprising:
    atomizing an aqueous suspension of cellulose nanofibrils and introducing the atomized aqueous suspension into a drying chamber of a drying apparatus;
    introducing ambient air into the drying chamber to evaporate a liquid portion of the aqueous suspension; and
    drying the aqueous suspension, thereby forming substantially non-agglomerated dried cellulose nanofibrils.

2. The method according to claim 1, further including collecting the dried cellulose nanofibrils.

3. The method according to claim 1, wherein at least one dimension of each of the dried cellulose nanofibrils collected is less than about 100 nanometers.

4. The method according to claim 1, wherein the cellulose nanofibrils in the aqueous suspension of cellulose nanofibrils comprise nanofibrillated cellulose fiber.

5. The method according to claim 1, wherein the air is heated.

6. The method according to claim 1, wherein the aqueous suspension further includes a surface modification agent which coats the surfaces of the cellulose nanofibrils and substantially prevents agglomeration of the dried cellulose nanofibrils.

7. The method according to claim 6, wherein the surface modification agent is sodium silicate.

8. The method according to claim 6, wherein the surface modification agent is detergent.

9. The method according to claim 1, wherein the method further includes adding a fluorinating agent to the aqueous suspension of cellulose nanofibrils such that the dried cellulose nanofibrils formed are fluorinated cellulose nanofibrils, and wherein the fluorination of the cellulose nanofibrils substantially prevents agglomeration of the cellulose nanofibrils.

10. The method according to claim 9, wherein the step of fluorinating the aqueous suspension of cellulose nanofibrils includes adding fluorosilane to the aqueous suspension of cellulose nanofibrils.

11. The method according to claim 1, wherein the cellulose nanofibrils in the aqueous suspension of cellulose nanofibrils comprise cellulose nanocrystals.

12. The method according to claim 11, wherein the aqueous suspension further includes a surface modification agent which coats the surfaces of the cellulose nanofibrils and substantially prevents agglomeration of the dried cellulose nanofibrils.

13. The method according to claim 12, wherein the surface modification agent is sodium silicate.

14. The method according to claim 11, wherein the method further includes adding a fluorinating agent to the aqueous suspension of cellulose nanofibrils such that the dried cellulose nanofibrils formed are fluorinated cellulose nanofibrils, and wherein the fluorination of the cellulose nanofibrils substantially prevents agglomeration of the cellulose nanofibrils.

15. The method according to claim 14, wherein the step of fluorinating the aqueous suspension of cellulose nanofibrils includes adding flourosilane to the aqueous suspension of cellulose nanofibrils.

16. A method of producing dried cellulose nanofibrils comprising:
    atomizing an aqueous suspension of cellulose nanofibrils and introducing the atomized aqueous suspension into a drying chamber of a drying apparatus;
    wherein the cellulose nanofibrils in the aqueous suspension comprise cellulose nanocrystals;
    wherein the aqueous suspension further includes a surface modification agent which substantially prevents agglomeration of the cellulose nanofibrils; and
    introducing a drying gas into the drying chamber to evaporate a liquid portion of the aqueous suspension, thereby forming dried cellulose nanofibrils.

17. A method of producing dried cellulose nanofibrils comprising:
    atomizing an aqueous suspension of cellulose nanofibrils and introducing the atomized aqueous suspension into a drying chamber of a drying apparatus;
    wherein the cellulose nanofibrils in the aqueous suspension comprise nanofibrillated cellulose fiber;
    wherein the aqueous suspension further includes a surface modification agent which substantially prevents agglomeration of the cellulose nanofibrils; and
    introducing a drying gas into the drying chamber to evaporate a liquid portion of the aqueous suspension, thereby forming dried cellulose nanofibrils.

18. A method of producing dried cellulose nanofibrils comprising:
    atomizing an aqueous suspension of cellulose nanofibrils and introducing the atomized aqueous suspension into a drying chamber of a drying apparatus;
    introducing nitrogen into the drying chamber to evaporate a liquid portion of the aqueous suspension; and
    drying the aqueous suspension, thereby forming substantially non-agglomerated dried cellulose nanofibrils.

* * * * *